US005134292A

United States Patent [19]

Segawa et al.

[11] Patent Number: 5,134,292

[45] Date of Patent: Jul. 28, 1992

[54] MOVING OBJECT DETECTOR AND MOVING OBJECT DETECTING SYSTEM

[75] Inventors: Hideo Segawa; Kazunari Naya; Haruhisa Goto; Kazuyuki Sato, all of Toda, Japan

[73] Assignee: Nippon Mining Co., Ltd., Tokyo, Japan

[21] Appl. No.: 745,965

[22] Filed: Aug. 12, 1991

Related U.S. Application Data

[63] Continuation of Ser. No. 476,053, Feb. 7, 1990, abandoned.

[30] Foreign Application Priority Data

| | | | |
|---|---|---|---|
| Feb. 7, 1989 | [JP] | Japan | 1-29001 |
| Apr. 14, 1989 | [JP] | Japan | 1-95038 |
| May 29, 1989 | [JP] | Japan | 1-134995 |
| May 29, 1989 | [JP] | Japan | 1-134996 |

[51] Int. Cl.[5] ........ G01J 5/12

[52] U.S. Cl. ........ 250/342; 250/353; 250/349

[58] Field of Search ........ 250/342, 353, 349, 338.3

[56] References Cited

U.S. PATENT DOCUMENTS

| | | | |
|---|---|---|---|
| 4,404,468 | 9/1983 | Kleinschmidt | 250/338.3 |
| 4,500,784 | 2/1985 | Hacskaylo | 250/341 |
| 4,529,874 | 7/1985 | Zeirhut | 250/221 |
| 4,542,294 | 9/1985 | Tamura et al. | 250/349 |
| 4,703,171 | 10/1987 | Kahl et al. | 250/221 |
| 4,704,533 | 11/1987 | Rose et al. | 250/349 |
| 4,764,755 | 8/1988 | Pedtke et al. | 250/340 |
| 4,873,469 | 10/1989 | Young et al. | 250/342 |
| 4,928,012 | 5/1990 | Lorenz | 250/352 |

*Primary Examiner*—Carolyn E. Fields
*Assistant Examiner*—Drew A. Dunn
*Attorney, Agent, or Firm*—Joseph W. Berenato, III

[57] ABSTRACT

Infrared rays radiated from a moving object is converged into a plurality of infrared ray detectors by optical system. Detecting area is instituted by the optical system so as to put the infrared rays into a plurality of the infrared ray detectors with time difference therebetween. Signal processing unit produces a detecting signal when there is a predetermined time difference between signals produced by a plurality of the infrared ray detectors. It is possible to avoid wrong operation which is caused by popcorn noise and a differential noise having a bit of time difference caused by temperature gradient in space. Forming a curved imaginary boundary line, a plurality of detecting zones are disposed at out side and inside of the curved imaginary boundary line to detect the object invading from any direction.

19 Claims, 13 Drawing Sheets

MOVING OBJECT DETECTOR AND MOVING OBJECT DETECTING SYSTEM

This application is a continuation of application Ser. No. 07/476,053, filed Feb. 7, 1990, now abandoned.

BACKGROUND OF THE INVENTION

1. Field of the Invention

This invention relates to infrared radiation object dectecting technology. More specifically, this invention relates to moving object detecting technology using a pyroelectric infrared sensor and an optical lens. This invention relates to, for example, a most effective technology for using a body detecting device for preventing crimes.

2. Description of the Prior Art

A moving object detector is already known as a pyroelectric infrared sensor which causes a starting signal to start an alarm unit disposed on a building or causes a control signal to open/close an automatic door by detecting an infrared radiation emitting moving object, such as a human body so on.

This infrared sensor is most suitable for a human body detector because it is free of wave dependency, inexpensive, and easily maintained.

On the other hand, a moving object detector, such as the pyroelectric infrared sensor, suffers from the problem of wrong operation caused by noise.

Noise sources of the pyroelectric infrared sensor comprise ① radiation noise caused by a heater, an air conditioner, or sunbeam, ② electromagnetic noise caused by a radio wave of communication, an electromagnetic spark, or thunder, ③ mechanical noise caued by vibrations or damages, ④ extrinsic noise such as a change in the temperature of the sensor due to heating of a circuit or air, and ⑤ intrinsic noise, referred to as popcorn noise, which randomly produces a current spike on time series when a carrier is trapped by a fault in the oxide film ($SiO_2$) or passivation film made from silicon nitride ($Si_3N_4$), disposed on a gate of a field-effect transistor.

In a conventional differential infrared ray detector, a couple of infrared detecting elements are connected together and are processed by opposite polarization for preventing wrong operation caused by the extrinsic noise of the ①~④ described above (laid open pub. No. 58-145326).

Such a detector has the advantage of preventing a detecting or alarm output by negating the voltages of the opposite polarization of each other in case a couple of infrared ray detecting elements receive noise at the same time. However, it is difficult to perfectly negate voltages of the opposite polarization of each other because of dispersion between a couple of the infrared detecting elements.

A first prior application (laid open pub. No. 63-40895) comprises at least a pair of differential infrared ray sensors disposed in a line along a moving direction of the moving object to produce element or detecting signals, respectively, an absolute value circuit connected to each of the sensors for producing absolute value outputs representative of the element signals, respectively, a subtractor connected to the absolute value circuit for producing a differential value signal between the absolute value outputs, and a comparator for comparing the differential value signal with a predetermined detectable level. Namely, the first prior invention mentioned above proposed a two-step negation which comprises one-step negation by the differential infrared sensors and second-step negation by the subtractor. Therefore, it is possible to avoid wrong operation caused by dispersion of the elements.

However, it is difficult to avoid wrong operation caused by intrinsic, noise such as the popcorn noise which is easily produced by either of a plurality of pyroelectric elements, even if wrong operation caused by the extrinsic noise can be avoided.

A second prior application has proposed (laid open pub. 63-1938) from a point view of the intrinsic noise mentioned above, an invention which comprises a couple of differential infrared ray sensors and a gate circuit for conjuncting a couple of element signals for avoiding the popcorn noise.

In this event, it is possible to avoid the extrinsic noise by the differential infrared ray sensors and to avoid the intrinsic noise by the AND circuit.

However, the extrinsic noise does not necessarily occur at a plurality of the elements at the same time. The extrinsic noise, for example, is produced by a temperature gradient in space caused by an air fluctuation, or by a time difference between elements caused by vibration transfer.

However, neither of the first and second prior inventions considers time difference between the element signals produced from the sensors. Namely, these prior inventions can not avoid the extrinsic noise having the time difference mentioned above because the time difference is not considered as a decision element. Therefore, there it is probably that wrong operations may occur.

Moreover, the second prior invention comprises a couple of sensors 1, 2 disposed along a moving direction of a human body, split and mirrors (on split lenses) *4a 4g* disposed in the face to the light reciving plane of the sensors 1, 2. Infrared rays radiating from the moving object are input into the sensors 1, 2 with a time difference by using the split mirrors *4a 4g*.

According to such prior invention, the moving object detecting system is capable of detecting the moving object only when the moving object invades parallel to a sensor-disposition detecting area which is defined by the sensors and the mirrors (or the lenses). However, it is impossible to detect the moving object when the moving object invades close to the sensors because of the detecting signals produced at the same time by a couple of the sensors. As a result, it can not help allowing that the moving object invades deep into the detecting area.

SUMMARY OF THE INVENTION

It is therefore an object of this invention to provide a moving object detecting technology for accurately detecting only a predetermined moving object which radiates human infrared rays while preventing wrong operation in the event of any extrinsic or intrinsic noise.

It is another object of this invention to provide a moving object detecting system of the type described, which accurately and immediately detects a moving object even if the moving object invades from any direction into a detecting area.

It is still another object of this invention to provide a moving object detector of the type described, which has a simple structure, and is possible to easily and accurately operate in order to institute of a detecting area and a fine adjustment when the detector is furnished.

It is yet another object of this invention to provide a moving object detector of the type described, which is easy for changing a detecting area mode, and has a simple structure, and has a low manufacturing cost.

Other objects of this invention will become clear as the description proceeds.

Considering the noise sources ①~⑤ mentioned above from a point of view of a human body detector, it is neccessary for the human body detector to consider a space-change representation of a human body moving as a signal source. But, the noise sources ①~⑤ have no relation with the moving object (because of no space-difference) and are considered as a time-change. Therefore, substantially, it is possible to avoid wrong operation only if the signal representative of the space-change is distinguishable from the signal representative of the time-change.

A moving object detector to which this invention is applicable includes a plurality of infrared ray detectors for detecting infrared rays radiated from a moving object in order to produce a plurality of element signals, and an element signal processing unit for processing a plurality of element signals. According to this invention, the moving object detector comprises an optical system for converging the infrared rays radiated from the moving object to a plurality of infrared ray detectors; a detecting area being defined by the optical system so as to input the infrared rays into a plurality of the infrared ray detectors with a time difference, therebetween. The element signal processing unit is responsive to a plurality of the element signals to produce a detecting signal when a plurality of the element signal have a predetermined time difference.

Preferably, the infrared detector comprises a differential infrared detector which has a pair of infrared detecting elements connected to each other in order to achieve an opposite polarization.

According to this invention, the element signal processing unit produces the detecting signal when two element signals have the predetermined time difference therebetween.

It is possible to avoid wrong operation caused by noises having a time difference produced by not only by the popcorn noise but also the temperature gradient within a space.

Furthermore, the extrinsic noise which may be simultaneously directed into a plurality of the pyroelectric elements can be negated by the differential infrared ray detectors.

An invasion from any direction into the detecting area may be detected by instituting a detecting area which comprises a boundary line having a round shape or radial shape around the sensor so as to detect an object when the object crosses the boundary line.

In accordance with this invention, there is provided a moving object detector for detecting a moving object when infrared ray detectors produce element signals having a time difference, and which further comprises an imaginary boundary line disposed at a predetermined position surrounding the infrared ray detectors. The predetermined detecting area comprising a plurality of external detecting areas and a plurality of internal detecting areas having a radial shape. A plurality of the external detecting areas which only the outside of the imaginary boundary line, and a plurality of the internal detecting area watch only inside of the imaginary boundary line.

The element signals can be produced by a plurality of the infrared ray detectors having a time difference even if the moving object moves parallel to the infrared ray detectors or comes close to the infrared ray detectors.

The imaginary boundary line is curved so as to surround the infrared ray detectors in order to make the moving object cross the imaginary boundary line. As a result, it is possible to accurately and immediately detect the infrared radiation moving object when the infrared radiation moving object invades from any direction into the detecting area.

DESCRIPTION OF THE PREFERRED EMBODIMENTS

Figure 1:
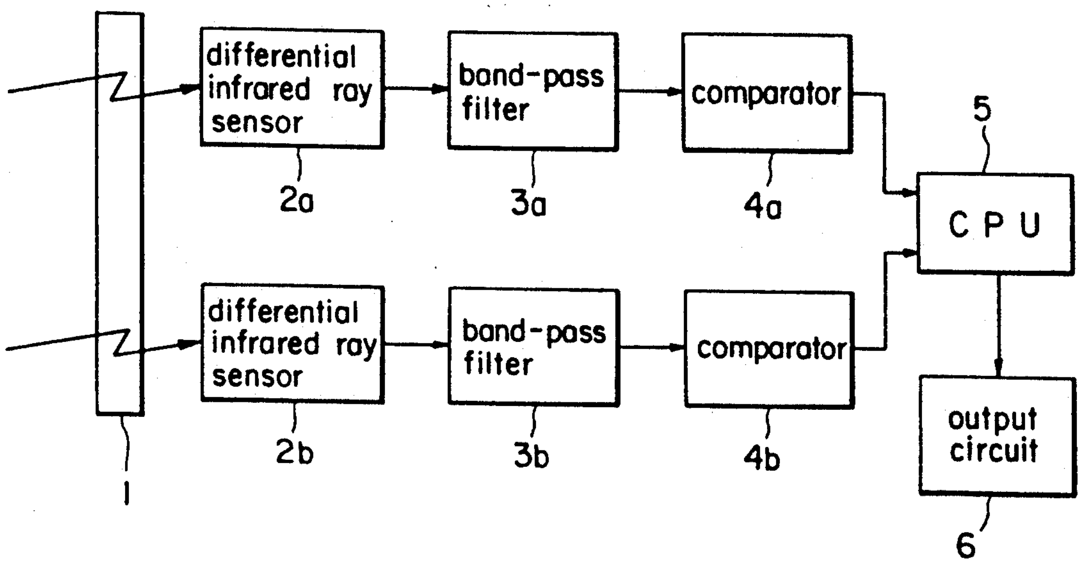
FIG. 1 is a block diagram of a moving object detector according to an embodiment of this invention.
Figure 2:
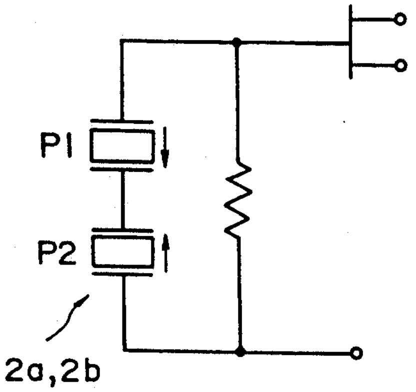
FIG. 2 is a circuit diagram for use in describing a infrared ray sensor illustrated in FIG. 1.

A moving object detector according to an embodiment of this invention is shown FIG. 1.

Optical system 1 comprises Fresnel lens or reflecting lens.

Differential infrared sensors 2a and 2b each have voltage elements P1, P2 directly connected to each other in order to make an opposite polarization. The optical system 1 is instituted to cause infrared rays, from different areas to converge into infrared sensors 2a, 2b. Band-pass filters 3a and 3b allow the passage of extracted element signals having a predetermined band representative of a human body or an average moving speed (0.2 m/s~9 m/s) from within element signals produced by the two infrared ray sensors 2a, 2b, respectively. Each band-pass filter 3a, 3b includes an amplifier (not shown) for amplifying the extracted element signals.

When the element signals produced by the infrared ray sensors 2a, 2b pass through the band-pass filter 3a, 3b, it is possible to avoid the influnce a temperature caused by air fluctuations at the low band and to avoid noise at the high band caused by an electric power unit. Comparators 4a and 4b compare the extracted element signals with a predetermined reference voltage, Vref, to produce compared element signals, respectively, when the extracted element signals are higher than a predetermined voltage Vref. Each of the 4a, 4b is capable of excluding infrared radiating objects, except a human body in the case of a human body detector, and of avoiding a bit of the extracted element signals representative of a difference current produced by the pyroelectric elements P1, P2 therebetween.

The compared element signals are supplied to a micro computer 5 as a judging means. The microcomputer judges whether or not the two compared element signals have a predetermined time difference therebetween, and produces a human body detecting signal when the two compared element signals have the predetermined time difference therebetween. The human body signal is supplied to an output circuit 6, such as a relay in order to operate an alarm unit, etc. As a result, it is possible to present wrong operation caused by the output circuit 6 caused by popcorn noise produced by, for example, one of the four pyroelectric sensors, since the popcorn noise is rarely produced at the same time. Similarly, it is possible to avoid wrong operations which are caused by noise having little time difference invading the infrared ray sensors 2a, 2b.

Figure 3A:
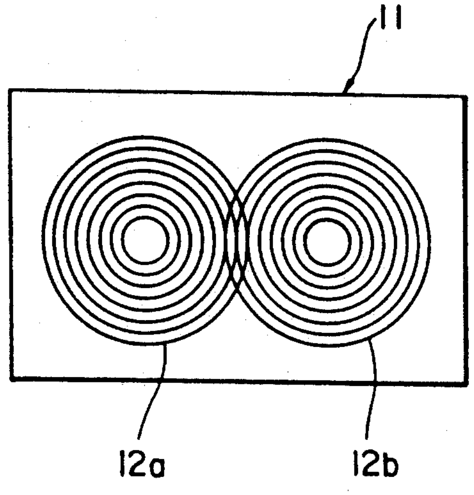
FIG. 3(A), (B) are, respectively a schematic front view of Fresnel lenses according to an example of an optical system and a schematic view of the converging action of the optical system.
Figure 3B:
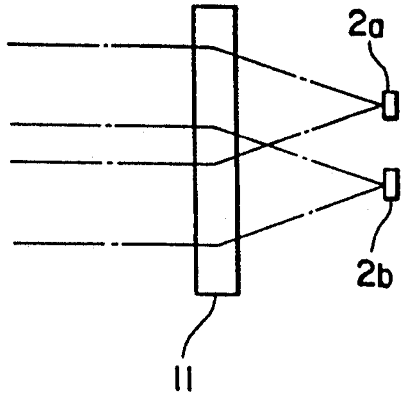
Figure 4:
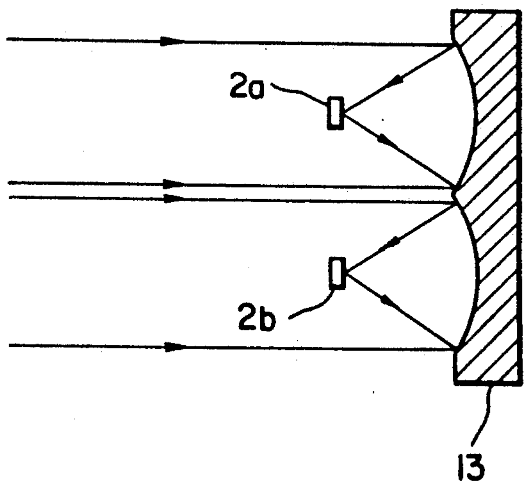
FIG. 4 is a schematic view of an example of a reflecting mirror as an optical system.

Construction of an optical system, for example, is shown in FIGS. 3, 4.

A fresnel lens comprises a clear board 11, made of polyethylene which is permeable to infrared rays, having a pair of concentric circles 12a, 12b, comprising a plurality of grooves, respectively, on a surface of the clear board 11. By forming a pair of concentric circles 12a, 12b parallel to each other as illustrated in FIG. 3(A), the fresnel lens cause infrared rays from different areas to converge onto the two infrared ray sensors 2a, 2b as illustrated in FIG. 3(B). Therefore, the different areas can be monitored at the same time. It is preferable to have the different areas adjacent each other, if it is possible. According to circumstance, a portion of the different areas may duplicate each other, or one side of the different areas may completely include the other side of the different areas.

The fresnel lens shown in FIG. 3 are formed to make a part of the different areas duplicate each other.

Referring to FIG. 4, an optical system 1 comprises a reflecting mirror 13 which has a pair of reflecting depressions having a common focal length.

In this case, the pair of monitoring areas are adjacent each other. Although the fresnel lens have a pair of monitoring areas according to this embodiment, it is possible to monitor rather three areas with a pair of infrared ray sensors 2a, 2b by increasing the number of the fresnel lenses or by use of a multi-split polygon mirror as the reflecting mirror.

Figure 5A:
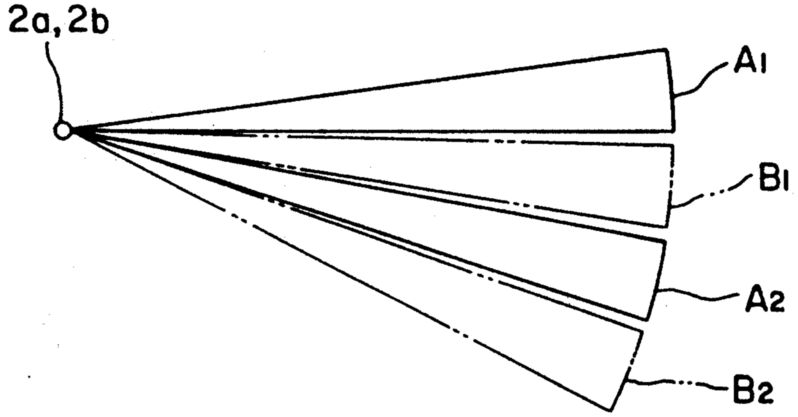
FIG. 5(A), (B), (C) are schematic views of examples used for instituting the detecting areas by an optical system.
Figure 5B:
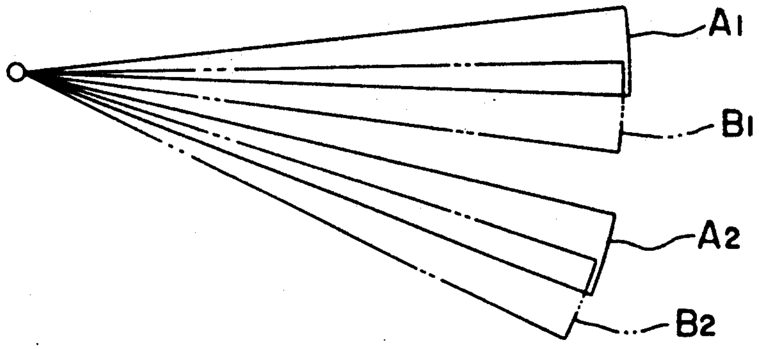
Figure 5C:
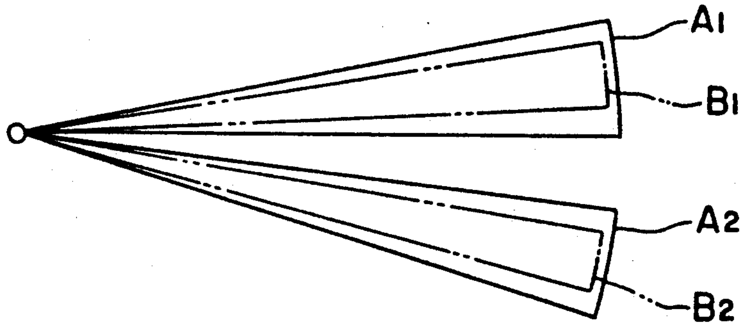

Referring to FIG. 5(A) (C), an optical system is instituted to monitor areas A1, A2 by the infrared ray sensor 2a and areas B1, B2 by the infrared ray sensor 2b. FIG. 5(A) shows a construction wherefor the monitoring areas are adjacent each other, and FIG. 5(B) shows a construction of the optical system wherein the monitoring areas A, B partially replicate each other, FIG. 5(C) shows a construction of the optical system wherein the monitoring area of the sensor 2b is completely included in the monitoring area of the sensor 2a.

As a result of such constructions of the optical system, the infrared ray sensors 2a, 2b produce element signals having a time difference, respectively, when the infrared radiating object crosses the monitoring areas A,B. The length of the time difference Tr is varied according to the moving speed or the moving direction of the object, or the way in which the monitoring areas are instituted. However, it is easy to establish a range for the time difference Tr which is representative of a human body as the detecting object, as long as the detecting object is limited as the human body.

According to the embodiment shown in FIG. 1, the micro-computer is responsive to the element signals at real time produced by the infrared ray sensors 2a, 2b and judges whether or not the time difference between the element signals is within the range which is defined by an upper boundary, Tmax and a lower boundary, Tmin. Both the upper and lower boundaries Tmax, Tmin are predetermined by a certain examination. The micro-computer 5 is for producing a human body detecting signal into the output circuit 6 when the value of the time difference is within the range.

Figure 6:
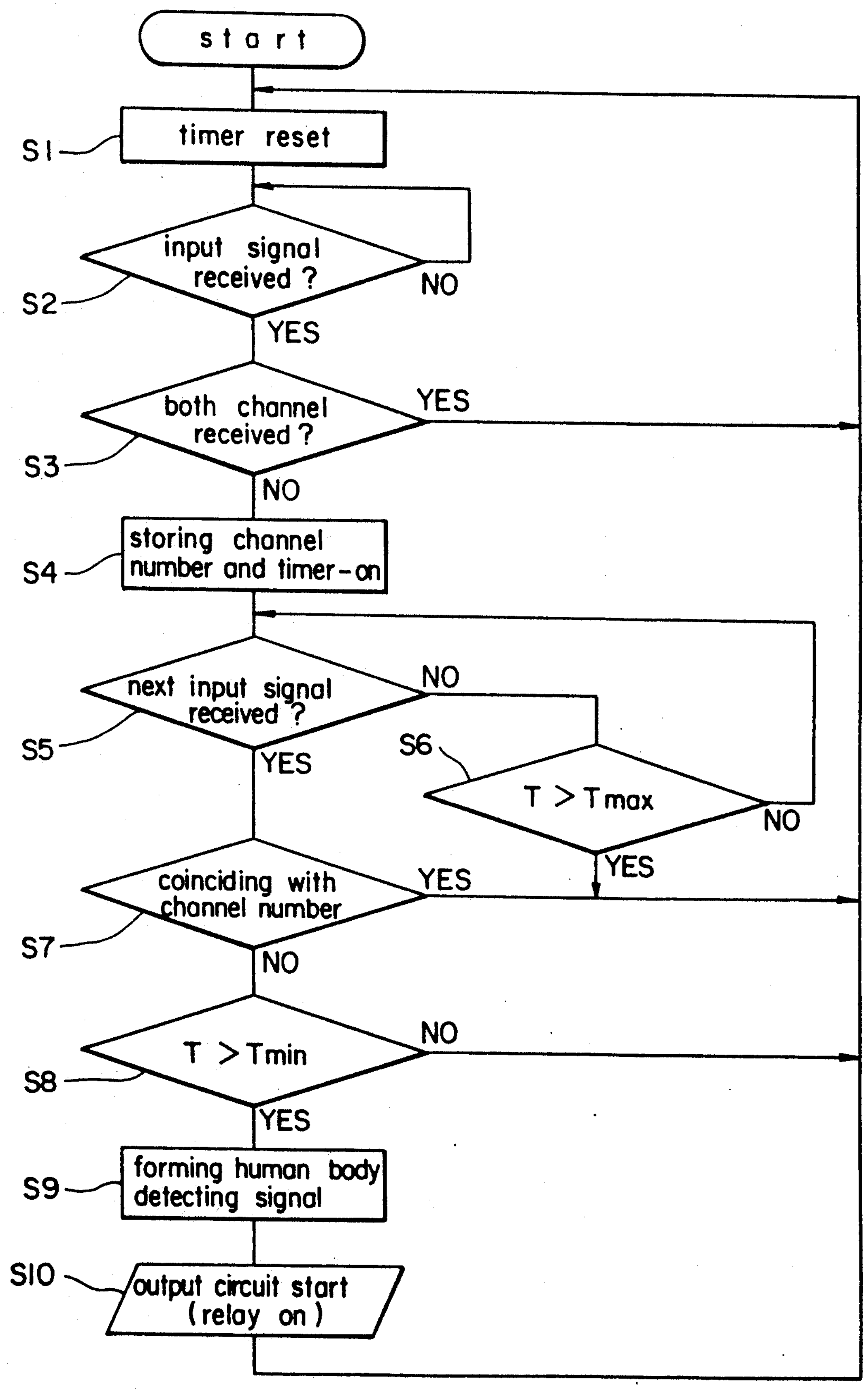
FIG. 6 is a flow chart of an example for use in a program of a microcomputer.

Referring to the flow chart of FIG. 6, the micro-computer 5 produces the human body detecting signal responsive to the compared element signals produced by the comparators 4a, 4b. When the micro-computer receives a signal, etc, a timer is reset at first stage S1. The first stage S1 proceeds to a second stage S2.

At the second stage S2, the micro-computer 5 waits until it receives an input signal.

When the micro-computer 5 receives the input, the second stage S2 is followed by a third stage S3 which will presently be described.

At the third stage S3, the micro-computer 5 judges whether the input signal is supplied from either a channel of the comparator 4a or the comparator 4B, and whether the input signal is supplied from both channels of the comparator 4a, 4b. When the judgement indicates both channels, then operation returns to the first stage S1. When the judgement indicates either the channel of the comparator 4a or that of then the comparator 4B, the third stage is succeeded by a fourth stage S4.

At the fourth stage S4, the micro-computer 5 memorizes the channel number of the comparator which supplied the input signal and starts the timer. The fourth stage S4 proceeds to a fifth stage S5.

At the fifth stage S5, the micro-computer 5 judges again whether or not the input signal is supplied from the comparator 4*a*, 4*b*. When the input signal is not supplied, the micro-computer 5 judges at sixth stage S6 whether or not the passage time T of the timer is beyond the maximum allowable time Tmax.

When the judgement indicates that the passage time T is not beyond the maximum allowable time Tmax, operation returns to the fifth stage S5, and waits for the input signal supplied from the comparators 4*a*, 4*b* until the passage time T is beyond the maximum allowable time Tmax. When the judgement indicates that the passage time is beyond the miximum allowable time Tmax after starting the timer, then operation returns to the first stage S1. This resets the timer while the input signal supplied from the comparators is awaited.

On the other hand, when the next input signal is received from the comparators 4*a*, 4*b* before the passage time of the timer is beyond the maximum allowable time Tmax, then the fifth stage S5 proceeds to the seventh stage S7.

At the seventh stage S7, the micro-computer 5 judges whether or not the received channel number of the comparator supplying the next input signal is coincident with the stored channel number at the fourth stage S4.

When the received channel number is coincident with the stored channel number, namely, two identical channel numbers are received, this operation returns to the first stage S1 at which the timer is reset and a new input signal is awaited. When the received channel number is not coincident with the stored channel number, the seventh stage S7 proceeds to the eighth stage S8.

At the eighth stage S8, the micro-computer 5 judges whether or not the passage time T of the timer is beyond the minimum allowable time Tmin. When the passage time T is not beyond the minimum allowable time Tmin, operation returns to the first stage S1 and repeats the process mentioned above. When the passage time T is beyond the minimum allowable time Tmin, the eighth stage S8 proceeds to a nineth stage S9.

At the nineth stage S9, the micro-computer 5 produces a human body signal and proceeds to a tenth stage S10.

At the tenth stage S10, the micro-computer 5 sets up the output circuit 6 by supplying the human body signal thereto.

According to the moving object detector, the extrinsic noise, which simultaneously put into the infrared ray detectors 2*a*, 2*b*, is avoided by an offset action caused by the differential sensors. Even if the difference between large extrinsic noises is not negated and is left as a differential noise because of the dispersion of the pyroelectric elements comprising the infrared ray sensors 2*a*, 2*b*, element signals representative of the differential noise, which are beyond the predetermined level, are cut by the comparators 4*a*, 4*b*, respectively. If these element signal are not cut by the comparators 4*a*, 4*b*, then the element signals are put into the micro-computer 5 at the same time and are then cut at the third stage S3 where the micro-computer 5 judges whether the element signals are from both channels.

When one portion of the differential noises is beyond the predetermined level of the comparators 4*a*, 4*b* or when the popcorn noise is produced by either of the infrared ray sensor 2*a*, or 2*b*, this such noise is excluded at the sixth stage S6 because the micro-computer 5 judges that the passage time T is beyond the maximum allowable time Tmax (T>Tmax) because the other portion of these element signals is not input into the micro-computer 5.

Moreover, when the extrinsic noise is put into the infrared ray sensors 2*a*, or 2*b* with a short time difference, or an object which radiates infrared rays similar to human infrared ray passes though the detecting area with much more speed in comparison with a moving normal speed of a human, then the extrinsic noise and the object are avoided by the judgement (T>Tmin) at the eighth stage S8 because the time difference between the element signals of both channels is short.

While this embodiment has described that the signals are processed by use software in the micro-computer as the judging means, it will readily be possible to process the signals by use of hardware comprising a timer or a logical gate circuit as the judging means.

According to this embodiment, the differential sensors are used for the infrared ray sensors 2*a*, 2*b* in order to effectively avoid the extrinsic noise. However, it is possible to use a single sensor instead of the differential sensors because the extrinsic noise which is input into the sensors at the same time can be avoid by the process of the first third stage S1 S3.

The differential infrared sensor comprises a pair of pyroelectric elements which are not only in serial but also parallel connection with each other which and are processed to be opposite polarization.

Description will now be made as regards the merits of this embodiment. According to this embodiment, an infrared ray detector for using detecting infrared rays radiated by a moving object comprises an optical system for focussing the infrared rays radiated from the object on a plurality of infrared ray detecting elements, the optical system being instituted so as to cause the infrared rays to be directed at a plurality of infrared ray detecting elements with time difference, respectively, and means responsive to element signals supplied by a plurality of the infrared ray detecting elements for producing a detecting signal when the element signals have predetermined time differences.

Therefore, the first object is to avoid any extrinsic noise which is directed at a plurarity of the infrared ray detecting elements at the same time. The second object is to avoid the popcorn noise which is produced by either of the infrared ray detecting elements. The third object is to avoid wrong operation caused by noises, having a little time difference, produced by a temperature gradient in a space. The fourth object is to avoid all causes of extrinsic or intrinsic noise which might cause wrong operation in order to detect a moving infrared ray radiation object, such as a human body, with high reliability.

In addition, a micro-computer is used for judgement according to this embodiment. Therefore, it is possible to decrease the number of parts of the construction and to easily construct the same in a compact way. The micro-computer is capable of carrying out complex judgement and supplying flexibility to a judging system by storing patterns of noises or human-wave forms as judging data.

While this embodiment has thus far been described in conjunction with an infrared ray detector in use for prevention of crimes and alarms, it will readily be possible for those skilled in the art to put this invention into practice in various other ways. For example, this invention is applicable to a detector for detecting whether or not a human body is disposed in a certain area, and for detecting an infrared radiating object other than a human body.

Figure 7:
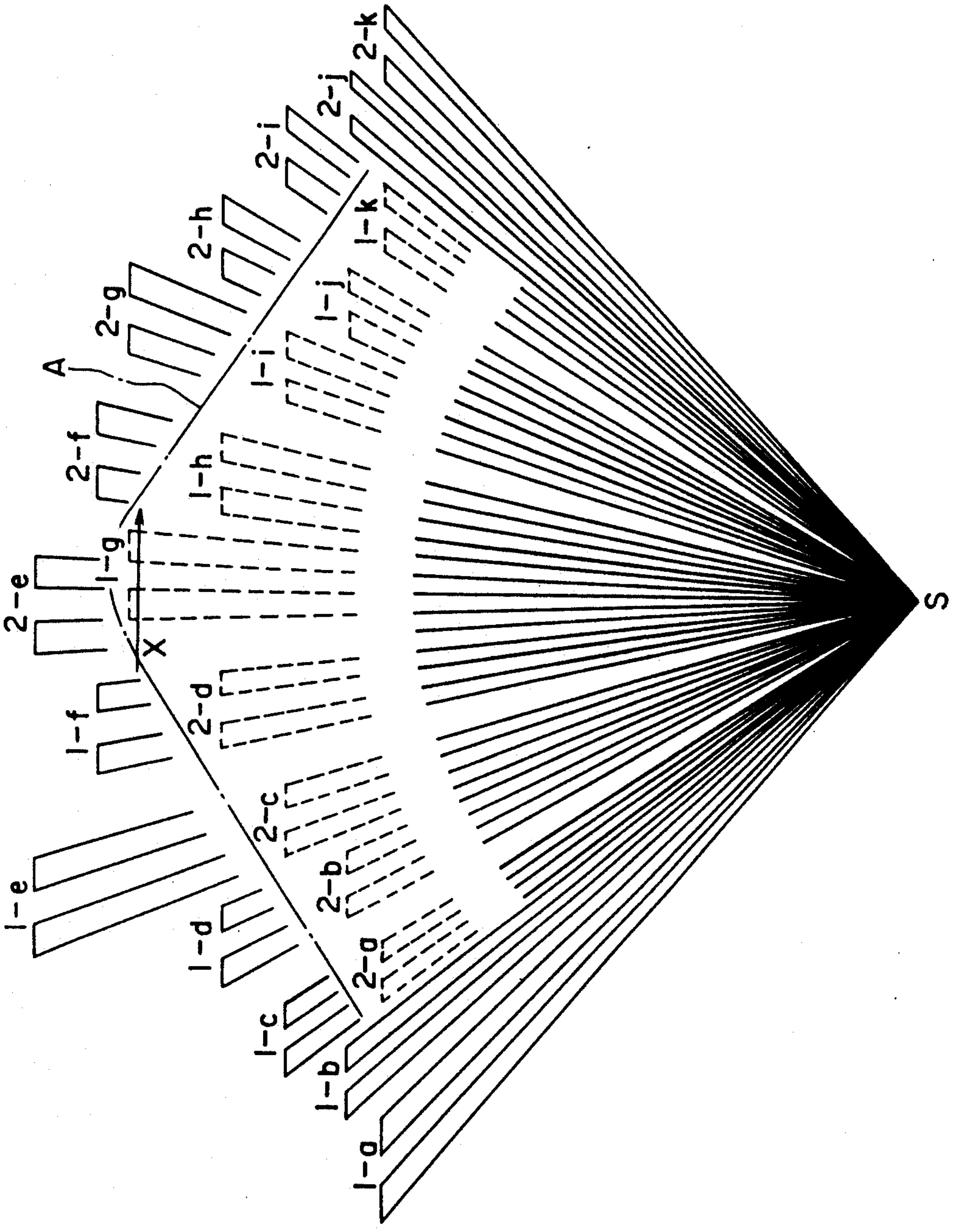
FIG. 7 is a schematic plane view of an example of a detecting area according to a second embodiment of a moving object detecting system according to this invention.

A detecting area of a moving object detecting system according to a second embodiment of this invention is shown in FIG. 7. A construction of sensors and optical systems (lenses) for instituting the detecting area are shown in FIG. 8.

Referring FIG. 7, a dot-and-dash line shows an imaginary boundary line surrounding sensor S at a predetermined distance spared from sensor S. The imaginary boundary line is parabola shaped in this second embodiment.

A plurality of long and narrow wedge provinces spread out from the sensor S and form a plurality of detecting zones, each of which comprises an infrared ray detecting element and a split lens. An assembly of a plurality of the detecting zones is formed so that the detecting area is fun-shaped.

Figure 8A:
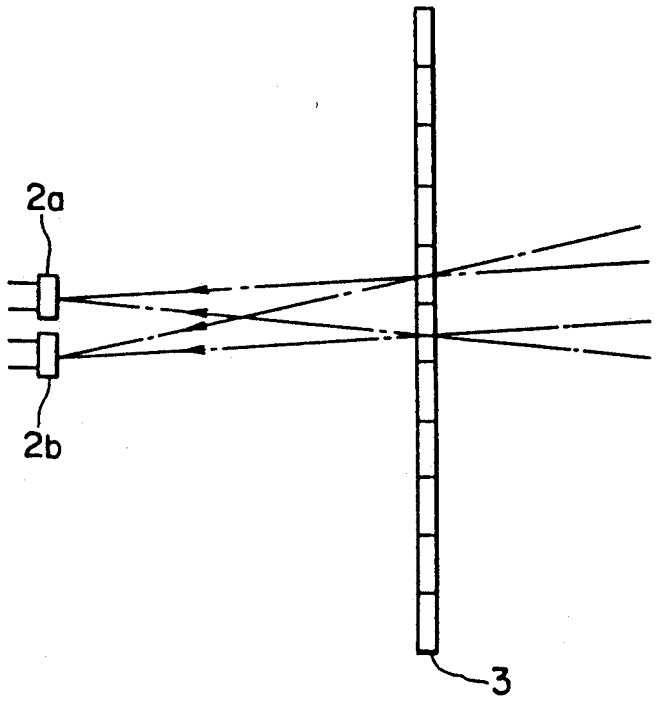
FIG. 8(A) is a schematic side view of an example of the lenses and infrared ray sensors of a moving object detector according to this invention.
Figure 8B:
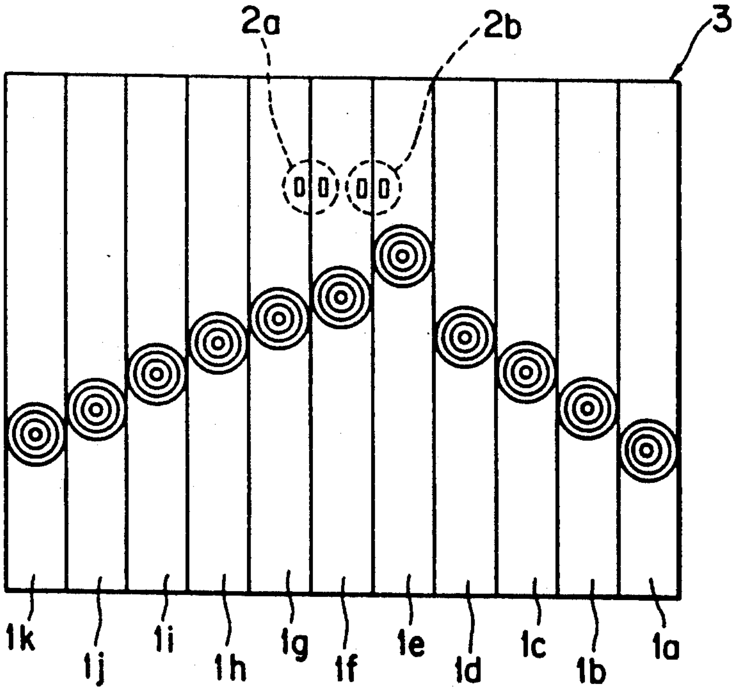
FIG. 8(B) is a schematic front view of a construction of lenses.

Referring to FIG. 8(A), for example, two infrared ray sensors 2*a*, 2*b* comprising dual pyroelectric elements, respectively, are disposed parallel to a lens 1. The lens 1 comprises a plurality of narrow shaped-split lenses 1*a*∼1*k* disposed parallel to each other as best shown in FIG. 8(B).

Figure 10:
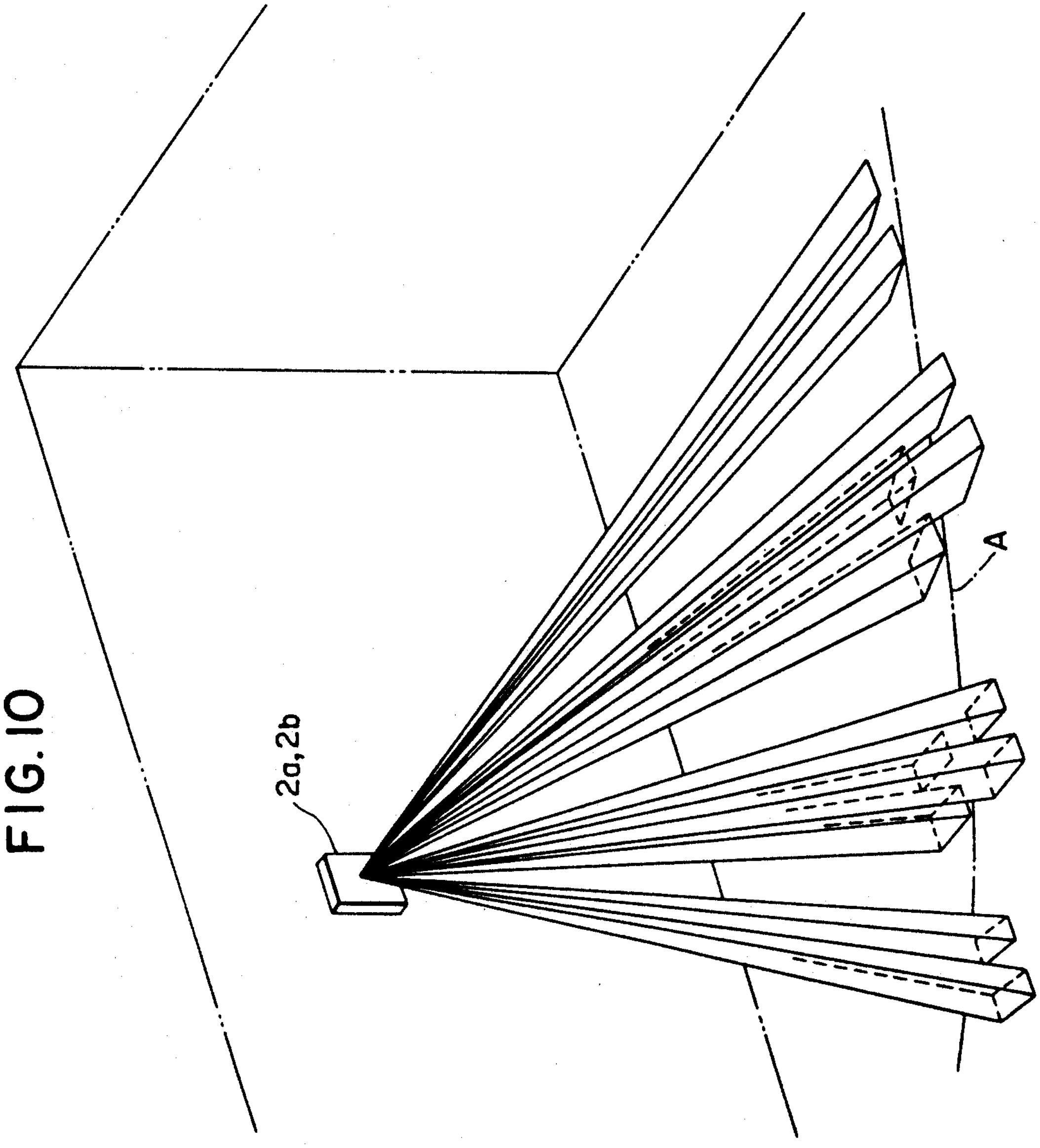
FIG. 10 is a schematic perspective view of an outline of the whole detecting area.

The center position of the split lens is higher the middle of the lens 1 than at the periphery of the lens 1 so as to be uneven-shaped. The lens 1 is disposed along a longitudinal direction thereof. The infrared ray sensors 2*a*, 2*b* are disposed at the same height relative to each other at the focal point of the lens 1. The infrared ray sensors 2*a*, 2*b* are disposed at a higher position than the center positions of the split lenses 1*a*∼1*k* shown in FIG. 8(B). Therefore, the sensors 2*a*, 2*b* look diagonally down toward the floor illustrated in FIG. 10. Is this example the detector comprising the infrared ray sensors 2*a*, 2*b* and the lens 1 is disposed at a building.

Figure 9:
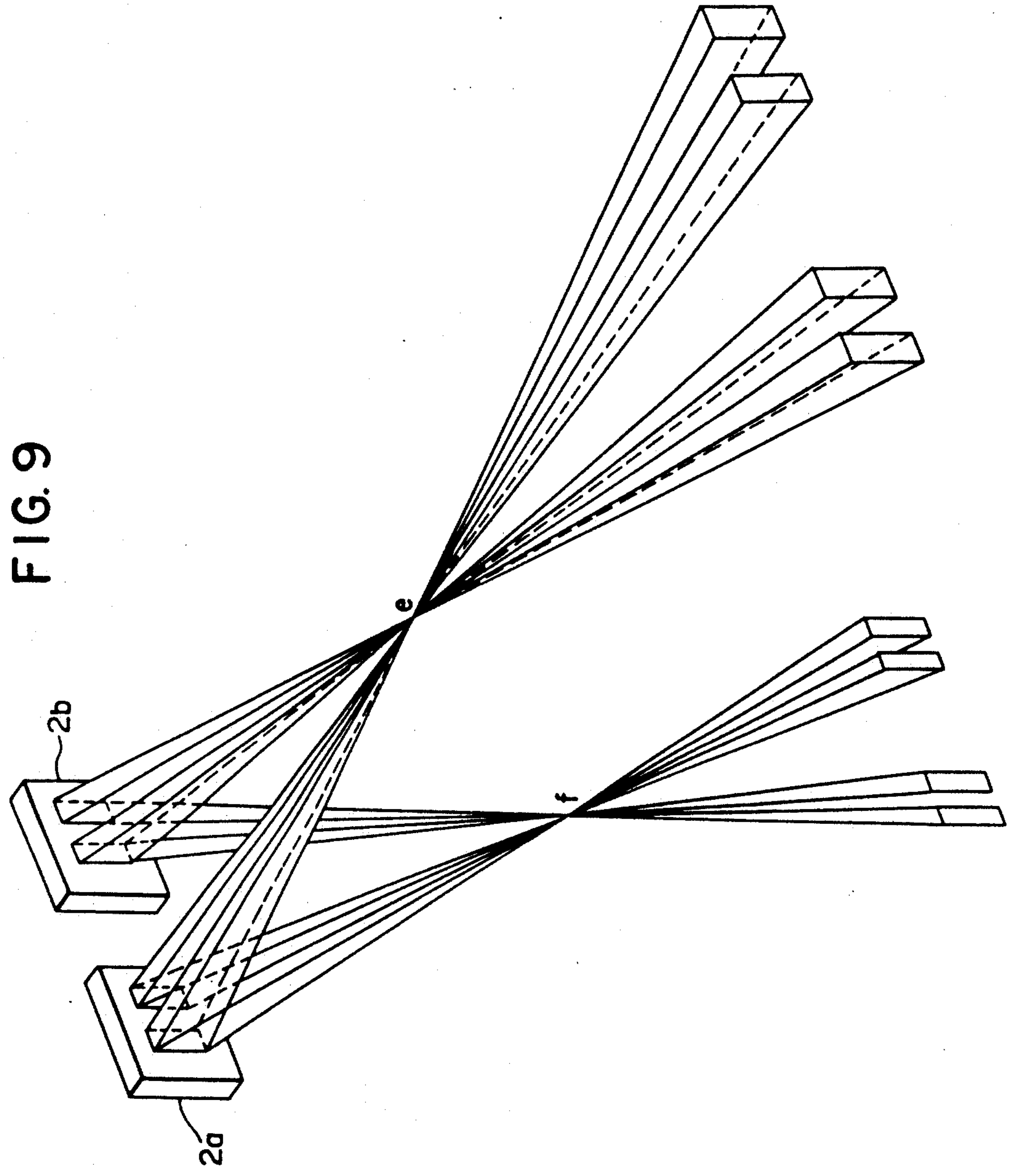
FIG. 9 is a schematic perspective view of a portion of a detecting zone instituted within a detecting area.

For the pair of split lenses illustrated in FIG. 9, each detecting zone is disclosed as a pyramid which is formed by extension lines extending from the exterior of each sensor through the centerpoint of the lenses.

The detecting zones of the sensors 2*a*, 2*b* are directed not only right and left but also up and down because of a pair of the split lenses have a difference in height relative to each other. Therefore, the parabola-shaped detecting area extending from the sensor S of FIG. 7 is formed by the detecting zones from either the infrared ray sensors 2*a* or 2*b* and each of the split lenses 1*a*∼1*k*.

Referring again to FIG. 7, the detecting zones 1-*a*, 1-*b*, . . . . 1-*k* are formed the combination in of the sensor 2*a* with the split lenses 1*a*∼1*k*, respectively, and the detecting zones 2-*a*, 2-*b*, . . . 2-*k* are formed by the combination of the sensor 2*b* with the split lenses 3*a*∼3*k*.

More specifically, the focal distance of the lens 1 is 30 mm, the electrode sizes of sensors 2*a*, 2*b* are 2×1 mm, respectively, and the pointed head of the detecting zone is desposed at 15 m ahead of the lenses. As a result, each pointed head size (sectional square) of the detecting zones is 100×50 cm.

When an object enters the detecting area set forth above and crosses the imaginary boundary line A, then the object is detected by the two sensors 2*a*, 2*b* because of the time difference therebetween. Therefore, it is possible to detect the object even if the object enters from any direction, for example, parallel or at a right angle direction to the sensor.

In this event, there is no problem in detecting the object by the sensors 2*a*, 2*b* as the long as time difference may be detected. Furthermore, the latter part of the signal processing system is instituted so as to detect the object even if an element signal varies with line difference at one of the sensors. This signal processing system may obtained in the manner similar to that of the first embodiment (referring to FIG. 1).

Figure 19:
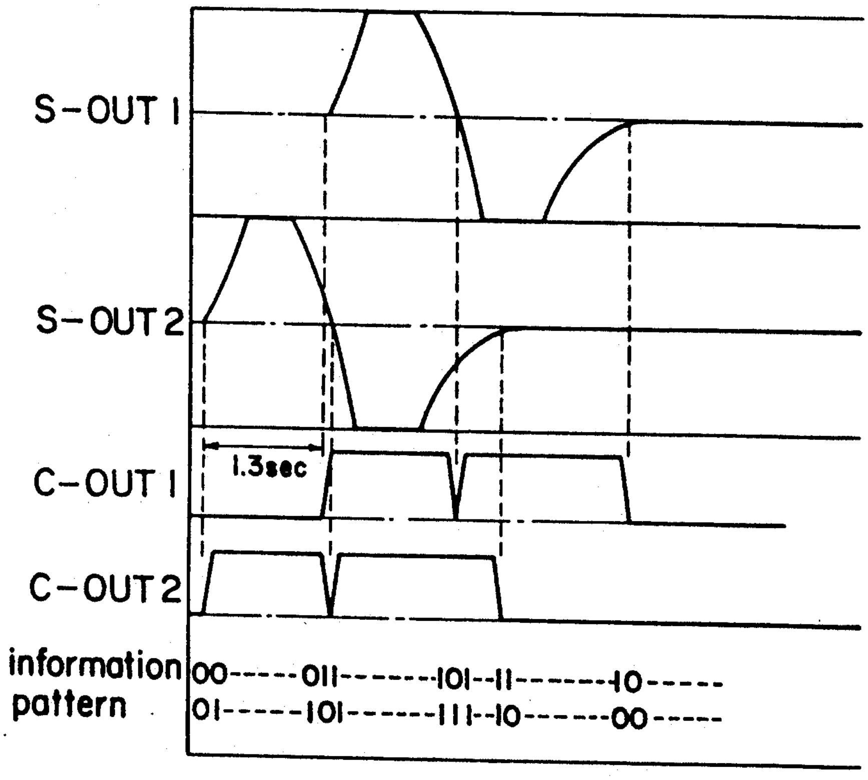
FIG. 19 is a series of graphs illustrating sensor output waveforms produced by two sensors according to the embodiment illustrated in FIG. 7, a comparator output waveform produced by a comparator in response to the sensor output waveforms, and an information pattern operated by binary code.

FIG. 19 is a graph showing the wave forms S-OUT-1, S-OUT2 of the element signals of sensors 2*a*, 2*b*, respectively, detecting pulse forms C-OUT1, C-OUT2 of compared element signals of comparators 4*a*, 4*b* when the human body enter at a moving speed, for example, of 1.0 m/s parallel to the sensor in a direction indicated by arrow X at 13 m ahead of the sensor.

In this event, the second sensor 2*b* detects the human body in order to produce an element signal. The comparator 4*b* is responsive to the element signal and produces a second compared element signal as a detecting pulse C-OUT2 (approximate 2.5 s). After approximately 1.3 s from the detection of the second sensor 2*b*, the first sensor 2*a* detects the human body. Similarly, the comparator 4*a* produces a first compared element signal as a detecting pulse C-OUT1, and then micro-computer 5 samples these detecting pulses with a clock having a predetermined period to produce information patterns comprising 0, 1 . . . The micro-computer 5 recognizes the pulse duration and detecting time differences of the sensors calculated from the information patterns for comparison with previously stored imformation, and then decides whether there has been enter of a human body and gives an alarm.

The output wave forms of the sensors 2*a*, 2*b* and the comparators 4*a*, 4*b* are shown by way of example in FIG. 19. The comparators 4*a* or 4*b* store information patterns and pulse duration and detecting time differences calculated from information patterns. The information patterns are produced by use of a sampling of a plurality of wave forms. For example, one wave form discloses that the invading object invades at the same position and the same angle of invasion (arrow X) but invading speed in comparison with that of the embodiment mentioned above, or other wave form discloses that the invading object invades at the different position and the different angle or by the different invading speed from the embodiment mentioned above. The computer 5 detects the invading of the human body by comparing the stored information with the pulses supplied from the comparators at real time.

In this embodiment, the invasion speed has a range of from between 0.1 m/sec∼10 m/sec and is selected for processing information pattern.

The construction of the detecting area is not restricted by the embodiment mentioned above (FIG. 7). Any constructions is capable, as long as the imaginary boundary line is between a plurality of the detecting zones. For example, this invention is applicapable to a split mirror instead of the split lens for use of forming the construction of the detecting area. And more, even only one infrared ray sensor is capable of forming the construction of the detecting area illustrated in FIG. 7 by alternately disposing the higher center point and the lower center point of the split lens. This form presents a chevron-shaped detection area illustrated in FIG. 8(B). In this case, it is possible to detect the object moving from side to side and back and forth. The imaginary boundary line is not restricted by the parabola-shaped detection area. Any shape is applicable to the imaginary boundary line as long as it surrounds the sensor, for example, round-shaped or so.

According to this embodiment mentioned above, the detecting zone is for detecting the object moving from side to side, namely, parallel to the sensors by mainly different positions of the sensors. The detecting zone is disposed parallel to the two sensors 2a, 2b which are set at the same height relative to each other. The detecting zone is formed for detecting the object which approches the sensors. However, it is possible to form the detecting area by disposing one sensor above the other sensor and substantially disposing the split lenses at the same height so as to detect the object moving from side to side.

According to this embodiment, the infrared ray sensor is a differential sensor comprising a pair of pyroelectric elements oppositely polarized which are serial connected to each other and also are parallel connected to each other. Furthermore, it is not necessary to use the differential sensor. A single type is applicable to the infrared ray sensor. Similarly, a thermopile, thermistor bolometer, etc. may be used instead of the pyroelectric sensor.

While this embodiment has thus far been described in conjunction with an infrared ray detector for use in prevent crimes and alarm, it will readily be possible for those skilled in the art to put this invention into practice in various other ways. For example, this invention is applicable to an infrared ray detector for detecting whether or not a human body exists within a certain area, or for detecting an infrared radiating object insert a human body.

A moving object detector to which this invention is applicable is for detecting the moving object by use of element signals having a time difference therebetween. The element signals are supplied from infrared ray sensors, respectively, which are for detecting within predetermined areas. According to this invention, an imaginary boundary line is formed so as to surround the infrared ray sensors disposed at predetermined positions. A detecting zone comprises a plurality of external detecting zones being watched until the outside of the imaginary boundary line is invaded, and a plurality of the internal detecting zones being watched only inside the imaginary boundary line. As a result, the moving object detector is capable of accurately and immediately detecting an infrared radiating object other a human body which invades from any direction into the detecting area.

The detecting area comprises a plurality of detecting zones, and employment of a polygon lens, instead of an increased number of sensors, is capable of reducing The number of parts of the circuits and inexpensively producing the detecting area. And more, the detecting area extend out from one side to the other side by using the polygon lens as the optical system. On the detecting zone in correspondece with one sensor is disposed at inside or outside of other detecting zone in correspondence with the other sensor.

As a result, it is possible to detect the object not only moving parallel to and toward the sensors, but also approaching the sensor.

Figure 11:
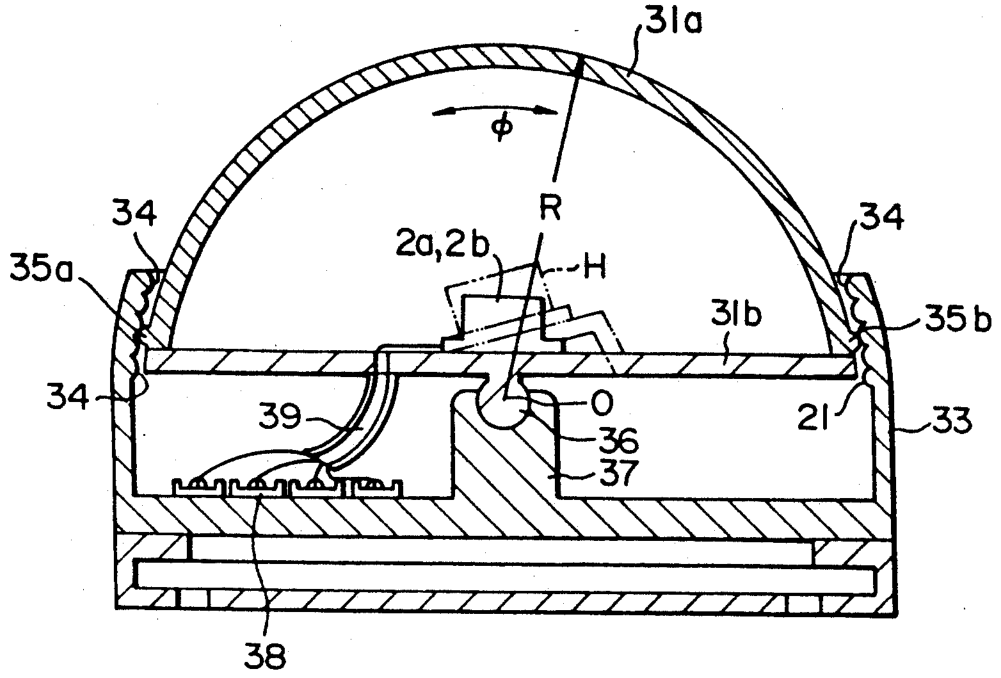
FIG. 11 is a schematic front sectional view of an optical system and a mounting device for mounting a sensor according to the invention.

Referring to FIG. 11, description will proceed to a detailed stucture of a holder for holding the optical lens and the sensor. The holder is suitable for the moving object detector according to this embodiment of this invention. This moving object detector according to this embodiment comprises a hemispheric hood 31a having a radius R, a base 31b being loaded with the hood 31a, and a case 33 holding the hood 31a and the base 31b. Although the hood 31a is made of infrared ray-permeable material and comprises a fresnel lens all over, a necessary part of the hood 31a may comprise the fresnel.

On the base 31b, the infrared ray sensors 2a, 2b and an electronic circuit (not shown) are disposed.

The case 33 for receiving and holding the hood 31a and the base 31b is cylindrical-shaped and has a bottom. An upper part of the cylindrical case 33 is bent along a certain width in correspondence with a surface of the hemispheric hood 31a.

The bent part has a plurality of hemispheric projections 34 continuously disposed along an inside of bent part.

On the other hand, the hood 31a has a pair of hemispheric projections 35a, 35b on a lower part of an outside of the hood 31a. The base 31b has a spheric pivot 36 at the center of the lower surface of the base 31b. The spheric pivot 36 is joined with a ball bearing 37 to be rotatable relative to each other. The ball bearing 37 is formed on the center of the upper surface of the botton of the case 33.

Figure 12:
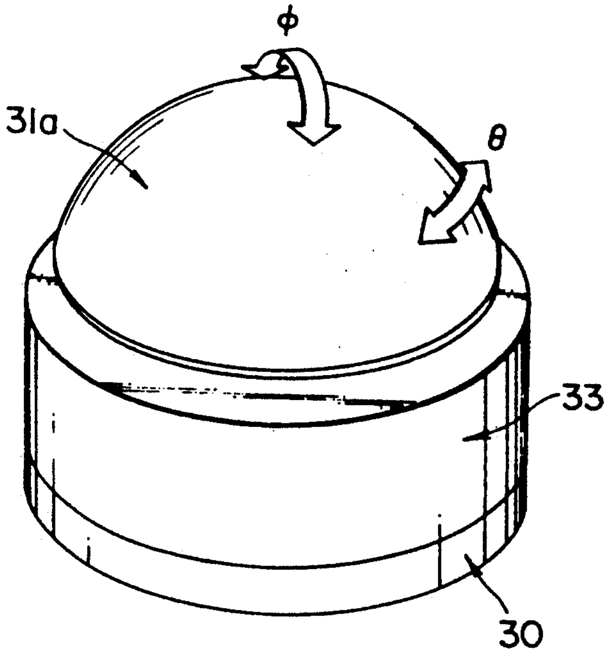
FIG. 12 is a schematic perspective view of an external appearance of the whole mentioned above.

Therefore, the hood 31a and the base 31b are capable of rotating opposite to the case 33 in the direction of circumference ($\theta$) of the hood 31a and in the direction of a right angle ($\phi$) opposite the circumference shown in FIG. 12.

Furthermore, a pair of the hemispheric projections 35a, 35b disposed on the outside of the hood 31a are applied by pressure with a plurality of the hemispheric projection 34 continuously disposed on the inside of the upper part of the case 33.

The position of the hood 31a depends upon a holding position. The projections 35a, 35b are held by either valleys made by five pieces of the projections 34 therebetween. When the hood 31a is rotated in the direction of $\theta$ or $\phi$ by hand, the projections 35a, 35b slide on the projections 34 with elastic transformation therebetween. And then, the projections 35a, 35b are held by the next valley. Therefore, it is possible to gradually change the position of the hood 31a. Preferably, the hood 31a and the case 33 are made of plastic for smoothly carrying out the gradual rotation.

An electrode 38 is disposed on the bottom board of the case 31 and transmits a signal between the sensors 2a, 2b and the exterior control device (not shown). The electrode 38 and the sensors 2a, 2b are connected to each other by a lead wire 39 having a loose length.

In this embodiment, the moving object detector mentioned above may be fixed on a wall or a ceiling by furnishing instrument 30.

It is preferable to provide a stopper for allowing rotation of the hood 31a in the direction of circumference ($\phi$) until a predetermined angle, for example, 180°.

According to this embodiment, a detector body includes a base for holding a sensor and a hemispheric hood (lens). The base is attached to the case at the center point thereof by a ball bearing-structure. The ball bearing makes the base and case rotate relative each other in the direction of the circumference ($\theta$) and in the direction of the right angle ($\phi$) opposite to the circumference. As a result, it is possible to easily set up the detecting area of and to easily and accurately adjust it.

Figure 13:
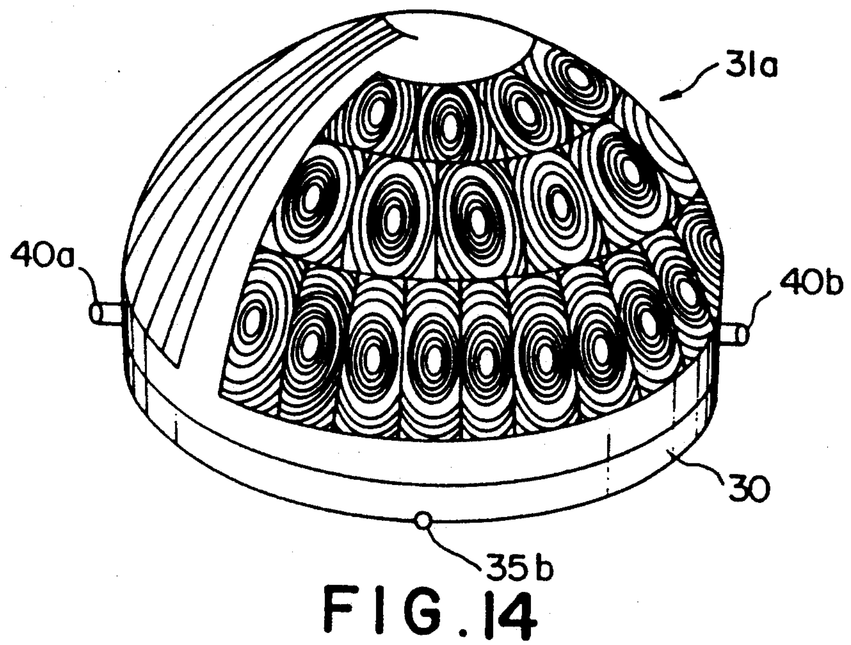
FIG. 13 is a schematic perspective view of a hood as an optical system according to another embodiment.
Figure 14:
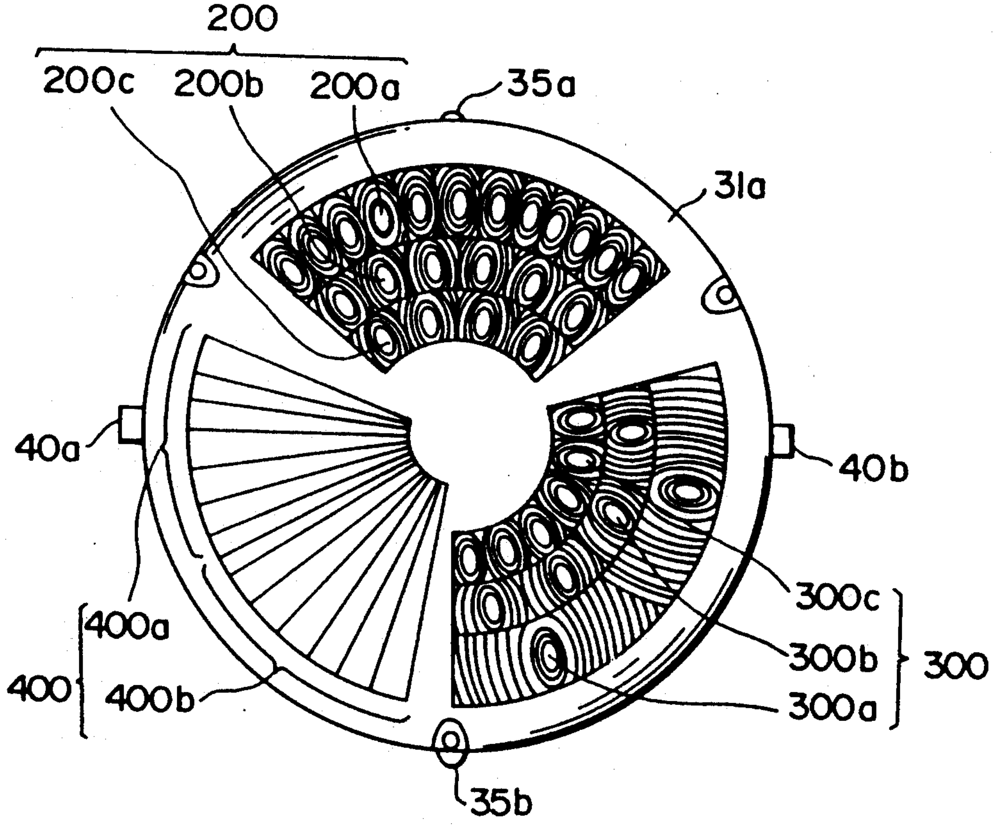
FIG. 14 is a schematic plan view of the hood mentioned above.

Referring to FIGS. 13, 14, the hood of the moving object detector is illustrated. The hood is capable of selecting three kinds of detecting area modes. Structure of this embodiment except the hood is similar to that of FIG. 11.

The surface of the hood 31*a* is split along the direction of the circumference into three blocks, each of which has an equal square. Each block includes difference kinds of lens units 200, 300, 400. Each of the lens units 200, 300, 400 comprises three kinds of lenses disposed inside the hood 31*a*. The lens units 200, 300, 400 are capable of realzing three kinds of detecting area modes, such as a wide angle detecting area mode, a long range detecting area mode, and a curtain-shaped detecting area, respectively.

The wide angle detecting area mode is for use in detecting a comparatively close area with a wide angle range. The long range detecting area mode is for detecting a passably far area with a narrow angle range. The curtain-shaped detecting area is for surface-detecting instead of dot-detecting.

More specifically, the wide angle detecting mode-lens unit 200 is split into three bands, from a fringe of the hood 31*a* to the top O. The most wide band is provided with twelve pieces of long distance-lenses 200*a*. The middle band is provided with six pieces of middle distance-lenses 200*b*. The band closest to the top is provided with four pieces of short distance-lenses 200*c*. These lenses are made from fresnel lenses, respectively.

Although the long range detecting area mode-lens unit 300 has a split structure of lenses similar to that of the wide angle detecting mode-lenses unit 200, each split len has a larger radius than that of the lens unit 200. The long range detecting area mode-lens unit 300 is split into three bands from a lower part of the hood 31*a* to the top O. The lower band is provided with two pieces of long distance-lenses 300*a*. The middle band is provided with four pieces of middle distance-lenses 300*b*. The top band is provided with six pieces of short distance-lenses 300*c*. When each split lenses has a large radius, it is possible to detect at a far distance because of the converging-power of the lenses.

The curtain-shaped detecting area mode-lens unit 400 comprises a pair of long and narrow cylindrical lenses 400*a*, 400*b*. Each of cylindrical lenses 400*a*, 400*b* has a plurality of waves parallel to the longitudinal direction. The waves cause converging of light from different directions by 90° relative to each other. As a result, a shadow reflected on the sensor becomes not line-shaped but dot-shaped.

Figure 15A:
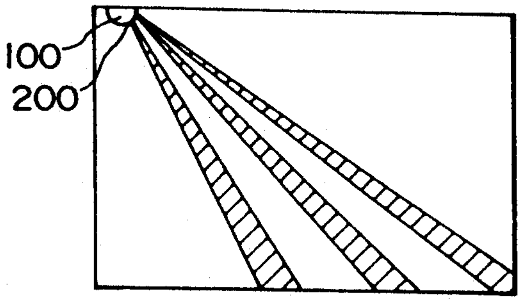
FIG. 15(*a*), (*b*) are schematic views of a detecting area instituted by lens having a wide angle detecting area mode.
Figure 15B:
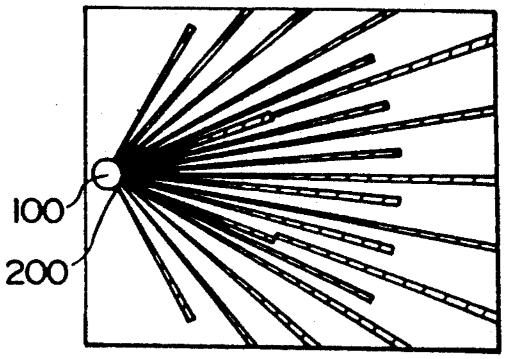

FIG. 15 (*a*), (*b*) show the detecting area achieve by use of the wide angle detecting area mode-lens unit 200. When the moving object detector 100, for example, is fixed at a corner of a roof in a room, it is possible to cover the wide range in the whole of the room. Parts of the oblique lines indicate detecting area.

Figure 16A:
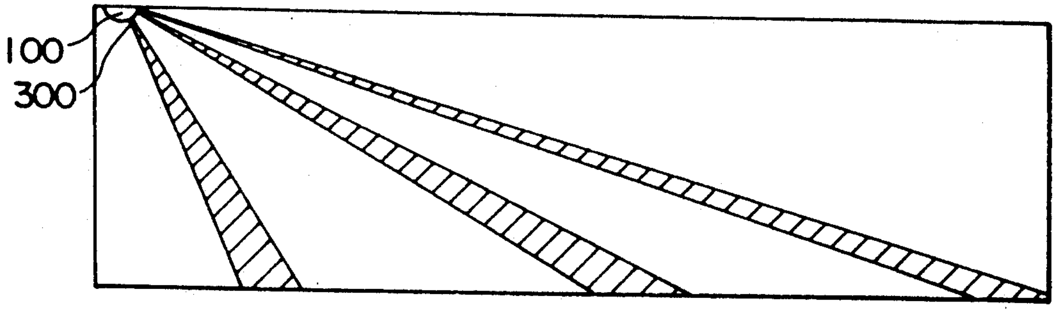
FIG. 16(*a*), (*b*) are schematic views of a detecting area instituted by a lens having a long range detecting area mode.
Figure 16B:
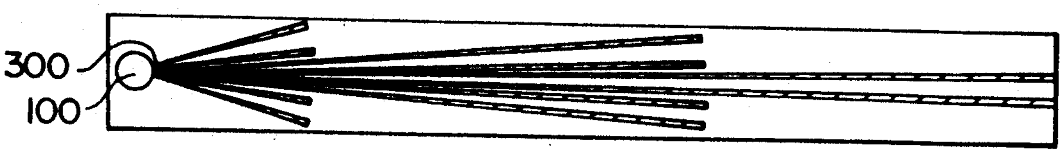

FIG. 16 (*a*), (*b*) show the detecting area achieved by use of the long range area mode-lens unit 300. When the moving object detector 100, for example, is fixed at a corner of roof in a passage, it is passible to detect a moving object invading from the opposite side and at a far distance.

Figure 17A:
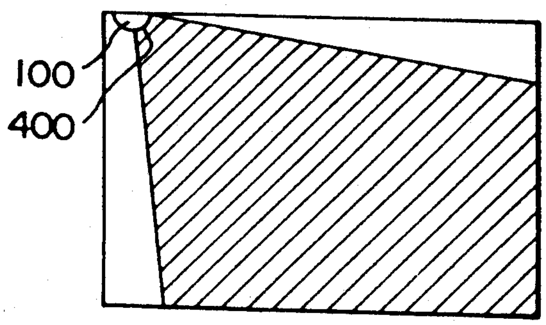
FIG. 17(*a*), (*b*) are schematic views of a lens having a cautain-shaped detecting area mode.
Figure 17B:
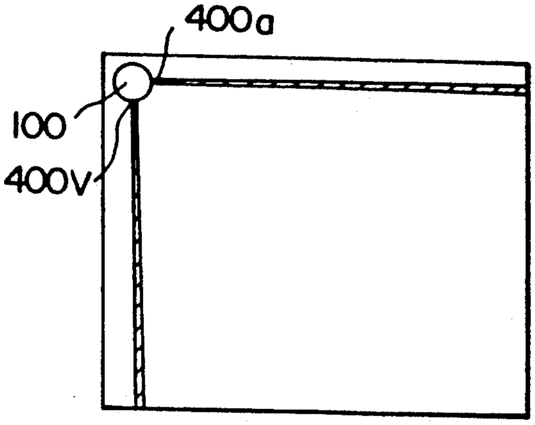

FIG. 17 (*a*), (*b*) show the curtain-shaped detecting area mode-lens unit 400. In this embodiment, a pair of cylindrical lenses 400*a*, 400*b* are used to make an orthogonal plane detecting area. When the moving object detector, for example, is fixed at an upper corner of a room comprising a wall with a window, the orthogonal plane detecting area is useful for detecting the object which crosses the window or the door etc.

Preferable, the sensors 2*a*, 2*b* disposed in the hood 31*a* lean toward one direction so as to be opposite to either the lens units, as illustrated by a dot-and-dash H line in FIG. 11.

The kind and number of the detecting area modes is not limited by the embodiments mentioned above. The hood 31*a* may be provided with more four kinds of mode-lens.

Figure 18:
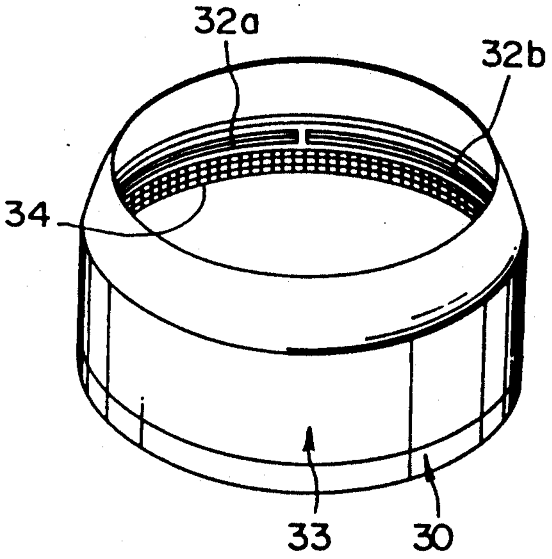
FIG. 18 is a schematic perspective view of an example of a case for holding a detector.

In this embodiment, the hood 31*a* is provided with pins 40*a*, 40*b* at the fringe thereof. The inside of the case 33 is provided with grooves 32*a*, 32*b* having a certain width along the circumference illustrated in FIG. 18. The grooves 32*a*, 32*b* are joined with the pins 40*a*, 40*b*, respectively. When the hood 31*a* is rotated by a certain angle, the pins 40*a*, 40*b* run against ends of the grooves 32*a*, 32*b*, respectively, and the rotation is obstructed. Therefore, a snapping of the lead wire is avoided. If the width of the grooves 32*a*, 32*b* increases the number by times rather than diameters of the pins 40*a*, 40*b*, the hood 31*a* is capable of rotating in the direction $\phi$. Description will now be made as regards merits of this embodiment. The detector includes a hemispheric hood and a lens unit. The lens unit has the plural kinds of detecting area modes. As a result, if only the hood is rotated, the detecting area mode is easily changed. Therefore, working efficiency increases in comparison with the prior art which has a method of changing the detecting area mode by exchanging the hood.

What is claimed is:

1. A moving object detector, comprising:
a) a plurality of detecting means for detecting infrared rays radiated by a moving object for producing a plurality of element signals;
b) an optical system for receiving infrared rays and for converging the infrared rays onto said plurality of detecting means;
c) producing means responsive to the plurality of element signals for producing a detecting signal when there is a predetermined time difference between the plurality of element signals; and,
d) said optical system comprises a hemispherical hood having a lens unit, a base connected to said hood and being loaded with said plurality of detecting means, a case holding said hood and said base to a bearing member and for permitting rotation of said hood and said base relative to said case.

2. The detector of claim 1, wherein:
a. Each of said detecting means includes a pair of pyroelectric elements interconnected to have opposite plurality.

3. The detector of claim 1, wherein:
a. Said optical system is split into a plurality of blocks, each of said blocks including a lens operably associated with one of said detecting means.

4. A moving object detector system, comprising:
a) a cylindrical support having an open end;
b) a base member positioned within said support and being movable relative thereto;
c) a hemispheric hood closing said open end and being movable relative to said base member, at least a portion of said hood is comprised of a material permitting infrared radiation transmission therethrough and providing a lens;
e) at least first and second detector means secured to said base member and cooperating with said hood portion for receiving infrared radiation and generating an element signal in response thereto; and
e) processing means operably associated with each of said detector means for generating a detection signal upon receipt of an element signal from each of said detector means within a predetermined period.

5. The system of claim 4, wherein:

a. said hood is secured to said base member.

6. The system of claim 4, wherein:

a. said hood is comprised of a material permitting transmission of infrared radiation.

7. The system of claim 4, wherein:

a. said lens is a Fresnel lens.

8. The system of claim 4, wherein:

a. first means movably secure said hood to said support; and, b. second means movably secure said base member to said support.

9. The system of claim 8, wherein said second means includes:

a. a ball and a socket, one of said ball and socket is secured to said base member and the other of said ball and socket is secured to said support.

10. A system of claim 8, wherein:

a. said at least first and second detector means are aligned with said second means.

11. The system of claim 10, wherein:

a. said second means extends from a first surface of said base member, and said at least first and second detector means extend from an opposite second surface.

12. The system of claim 8, wherein first means include:

a. a plurality of first projections extending radially inwardly from said support, and a plurality of second projections extending radially outwardly from said hood and interdigitated with said first projections.

13. The system of claim 4, wherein:

a. the diameter of said support at said open end is less than the diameter at the end opposite thereto.

14. The system of claim 4, wherein: a said support includes a closed end opposite to said open end.

b. at least a first electrode is mounted to said closed end; and, c. means interconnect said at least a first electrode with said detector and processing means.

15. The system of claim 4, wherein:

a. said hood is comprised of a material permitting infrared radiation transmission therethrough; and, b. said hood is substantially covered with Fresnel lenses.

16. The system of claim 15, wherein:

a) said Fresnel lenses are arranged into a plurality of blocks, wherein each of said blockscollects infrared radiation form from a predtermined region.

17. The system of claim 16, wherein:

a) at least one of said blocks is split into a plurality of bands, wherein each of said bands collect infrared radiation originating at a predetermined distance.

18. The system of claim 6, wherein:

a. each of said blocks extends circumferentially around said hood, and each block is disposed adjacent another of said blocks.

19. The system of claim 6, wherein:

a. each of said blocks emcompasses a predetermined region of said hood.

* * * * *